INVENTORS
RONALD H. ARTHUR
LOUIS CETRAN
JOHN H. HOLLAND
BY Thomas S. Ross
Joseph R. Spalla
ATTORNEYS INVENTORS
RONALD H. ARTHUR
LOUIS CETRAN
JOHN H. HOLLAND
BY Thomas S. Ross
Joseph R. Spalla
ATTORNEYS INVENTORS
RONALD H. ARTHUR
LOUIS CETRAN
JOHN H. HOLLAND
BY Thomas S. Ross
Joseph R. Spalla
ATTORNEYS INVENTORS
RONALD H. ARTHUR
LOUIS CETRAN
JOHN H. HOLLAND
BY Thomas S. Ross
Joseph R. Spalla
ATTORNEYS INVENTORS
RONALD H. ARTHUR
LOUIS CETRAN
JOHN H. HOLLAND
BY Thomas S. Ross
Joseph R. Spalla
ATTORNEYS Feb. 6, 1962 L. CETRAN ET AL 3,019,881

AUTOMATIC LINE FEEDING AND TABULATING APPARATUS FOR TYPEWRITERS OR LIKE MACHINES

Filed March 18, 1960 8 Sheets-Sheet 6

INVENTORS
RONALD H. ARTHUR
LOUIS CETRAN
JOHN H. HOLLAND

BY Thomas S. Ross
Joseph R. Spalla
ATTORNEYS

INVENTORS
RONALD H. ARTHUR
LOUIS CETRAN
JOHN H. HOLLAND
BY Thomas S. Ross
Joseph R. Spalla
ATTORNEYS Feb. 6, 1962 L. CETRAN ET AL 3,019,881

AUTOMATIC LINE FEEDING AND TABULATING APPARATUS FOR TYPEWRITERS OR LIKE MACHINES

Filed March 18, 1960 8 Sheets-Sheet 8

INVENTORS
RONALD H. ARTHUR
LOUIS CETRAN
JOHN HOLLAND
BY Thomas S. Rose
Joseph R. Spella
ATTORNEYS United States Patent Office 3,019,881

Patented Feb. 6, 1962

3,019,881

AUTOMATIC LINE FEEDING AND TABULATING APPARATUS FOR TYPEWRITERS OR LIKE MACHINES

Louis Cetran, Newington, and Ronald H. Arthur and John H. Holland, West Hartford, Conn., assignors to Royal McBee Corporation, Port Chester, N.Y., a corporation of New York Filed Mar. 18, 1960, Ser. No. 15,968
14 Claims. (Cl. 197—114)

This invention relates to automatic line feeding and tabulating apparatus for typewriters or like machines; more particularly it relates to an automatic line feeding and tabulating apparatus wherein the extent of line feeding and tabulating is under control of vertical and horizontal program units set up for a particular form; and specifically it relates to an automatic line feeding and tabulating apparatus wherein line feeding or tabulating advance is initiated at the typewriter keyboard and is terminated by its respective program device.

Present day business practice involves the entry of information on forms designed to carry different classes of information. In such forms predetermined vertical zones are reserved for the insertion of particular classes of information e.g. address information, order number information, quantity and description information, etc. As is well recognized, the line space requirements between lines of typing may vary within a zone or between zones as may the horizontal format or tabular stop setup between zones. Typing on these forms is not only tiresome but more important, time consuming in that an operator is required, after typing a line or after inserting information in a particular zone, to initiate a plurality of line feed operations to properly position the form in accordance with the spacing dictated by the form within and between zones. Further where, as is usual, the horizontal format changes from zone to zone either the tabular stop set up has to be changed or unnecessary tabbing through positions required in preceding or succeeding zones is required.

In accordance with the instant invention horizontal and vertical program devices set up for particular forms on which information is to be entered, and operatively associated with typewriter line feed and tabulating mechanism, reduce an operator's work load by eliminating tabulation set up time and extra tab and line feed key strokes. An operator is also relieved from the necessity of watching the form in the machine to determine the extent of line feed and tabulation. With the present invention an operator after having selected the proper program devices may type a complete form without stopping and without removing her eyes from the material she is copying; the proper amount of line feeding and tabulation being effected simply by a single operation of the proper key on the keyboard.

Briefly, the vertical control hardware of the invention comprises a key puller solenoid for initiating operation of line feed mechanism and a mechanical coupling to the line feed mechanism which advances a program device one step for each line feed. The program device is sensed and signals developed by the sensing means are effective to de-energize the key puller solenoid to stop operation of the line feed mechanism at desired vertical positions.

The horizontal control hardware, in brief, comprises a permanently set tab stop rack and a solenoid operated tabulation terminating device adapted to be interposed into the tabular stop rack and to be engaged by one of the set tabular stops. The solenoid is adapted to be energized when effective ones of a plurality of switch positions in a conditioned one of a plurality of switching tracks, each having a plurality of switch positions disposed longitudinally of the carriage at tabulation terminating positions are bridged upon movement of the carriage thereto. Predetermined ones of the switch positions are rendered effective by a changeable program device and predetermined ones of the switching tracks are conditioned by the vertical programming unit upon movement of the form to different vertical zones; i.e. when the form moves to a different vertical zone, a different horizontal format is automatically selected through the vertical programmer.

An object of the invention is the provision of an automatic line feed mechanism whose operation is initiated by key depression and terminated by a program device.

Another object of the invention is in the provision of a format control system wherein progression of a form is entirely under control of program units.

Another object of the invention is to provide an integrated vertical and horizontal format control system for typewriters of like machines.

Another object of the invention is the provision of a format control system which reduces a typist's work load by eliminating tabulation setup time and extra tab and line feed key strokes.

A further object of the invention is to provide a programmed control system for automatically controlling line feed and tabulating mechanisms in a typewriter.

A still further object of the invention is the provision of a control system employing selectively operable memory devices adapted in response to key operation to initiate line feed operation in response to signals from a program device to terminate line feed operation after a number of line feed cycles as determined by the key depressed and the program device has been accomplished.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

The invention may be embodied in typewriters or like machines but for purposes of illustration, the invention is shown embodied in an electric typewriter and more particularly a Royal Electric Typewriter of known construction. The drawings therefore show only enough of the presently known Royal Electric construction to assist in illustrating the manner in which mechanism in accordance with the invention is associated therewith.

Figure 1:
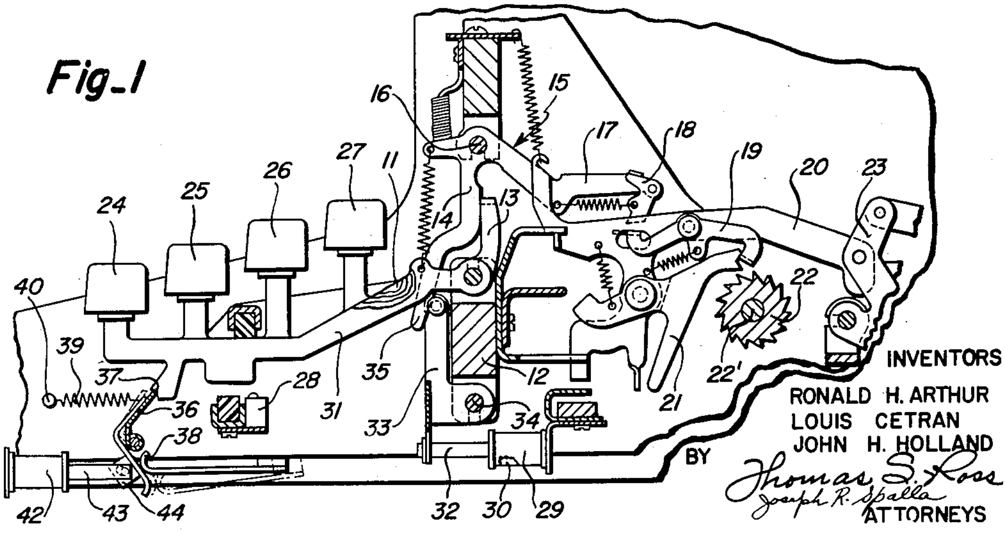
FIGURE 1 is a cross sectional view of a typewriter function powering mechanism modified for actuation by key puller solenoids and showing control keys in accordance with the invention.

Referring now to the Figures wherein like reference numerals designate like or corresponding parts throughout the several views and in particular to FIGURE 1 there are shown known parts of the Royal Electric mechanism for powering typewriter functions.

This mechanism comprises key operated levers 11 pivoted on a cross bar 12 and provided with upward projections 13 disposed behind arms 14 of levers 15 pivoted on the frame cross bar as at 16. Each lever 15 has another arm 17 on which a limber dog or flipper 18 is provided. Clockwise movement of arm 17 causes flipper 18 to rotate a pawl latch member 19, which is pivoted to an actuator 20, to release a pawl 21 carried by the actuator 20 into a continuously running snatch roll 22. The snatch roll then drives the pawl and actuator forwardly so as to rock a bell crank lever 23.

In accordance with the invention carriage return operation is adapted to be accomplished through electromechanical actuation of an action as described above; the electromechanical actuation being initiated by energization of a carriage return key puller solenoid 29 upon closure of a carriage return key lever operated switch as will hereinafter appear.

Figure 2:
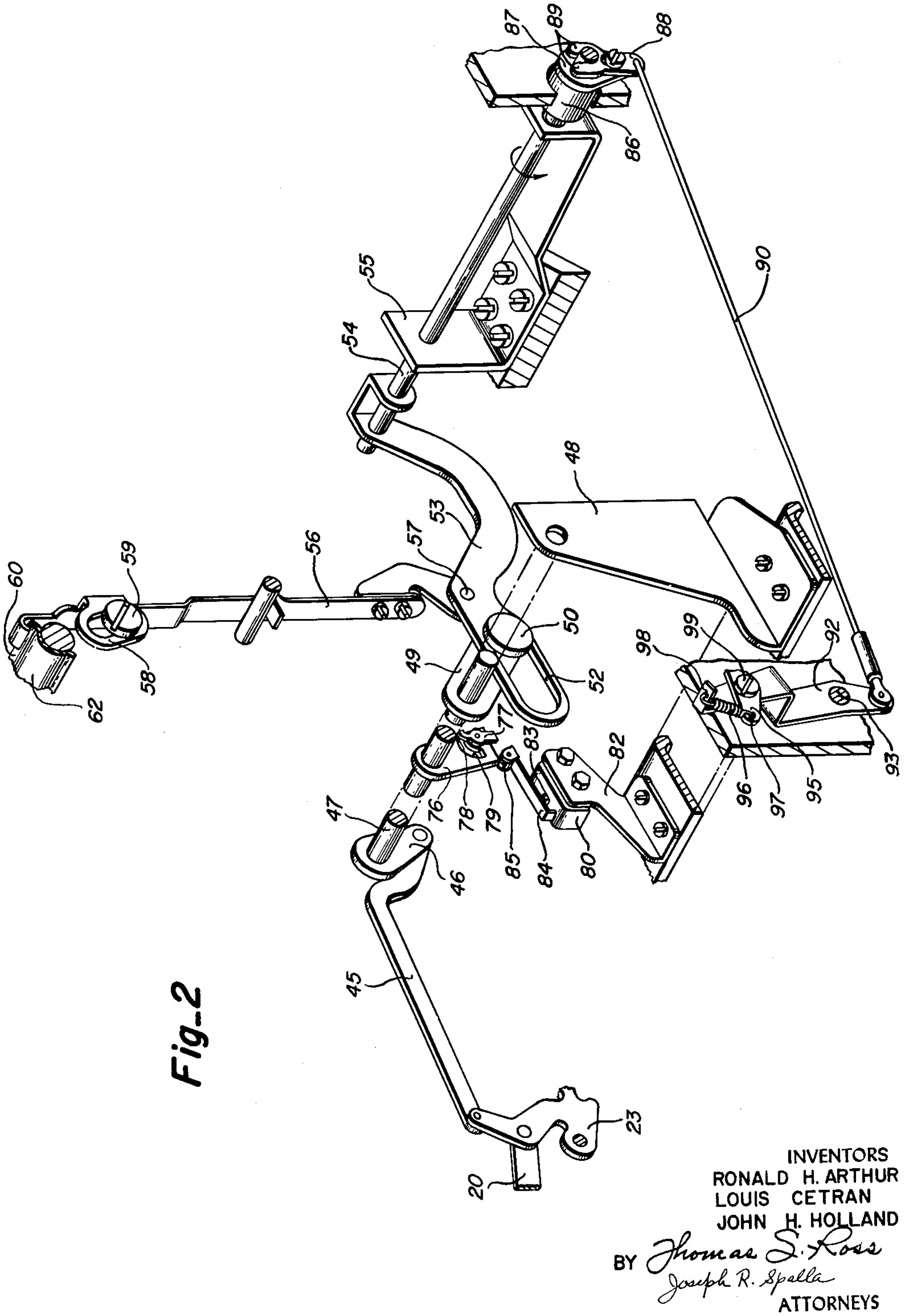
FIGURE 2 is a perspective view of one form of line feed mechanism in accordance with the invention.

Line feed operation is adapted, in accordance with the FIGURE 2 embodiment, to be accomplished through electromechanical actuation of an action as described above, or, in accordance with the FIGURE 3 embodiment, through electromechanical operation of conventional repeat line feed mechanism.

Figure 3:
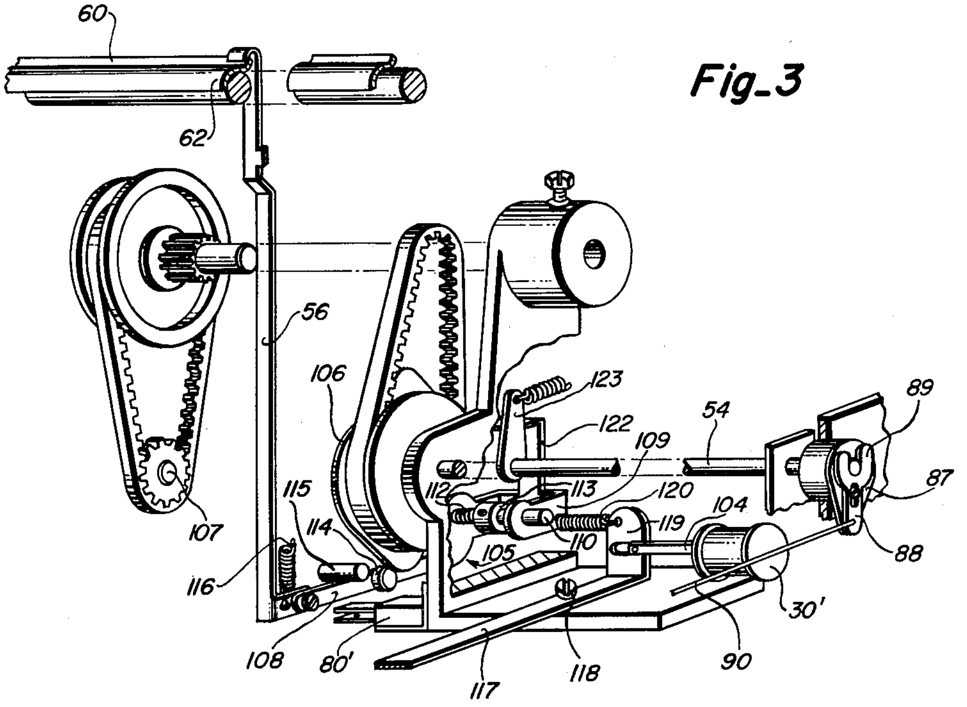
FIGURE 3 is a perspective view of an alternative construction of a line feed mechanism.

In both the FIGURE 2 and FIGURE 3 line feed mechanism embodiments, the electromechanical actuation is initiated by energization of a line feed solenoid 30 upon depression of any one of four keys: a line feed key 24, a carriage return key 25, a zone key 26 and a home key 27. The key levers 31 associated with these keys may also be pivoted on the frame cross bar but differ from conventional key levers in that they are not provided with upward projections 13. It is to be understood that the locations and the key forms shown are merely exemplary. Each of these keys is adapted upon depression to effect the closure of an associated switch 28 mounted below its respective key lever. Closure of the carriage return, zone and home switches 28 is adapted, as will hereinafter more fully appear, to effect the energization of the carriage return key puller solenoid 29 and the line feed key puller solenoid 30 thereby to initiate carriage return and line feed operations, respectively. As seen in FIGURE 1 the carriage return solenoid 29 is mounted on the typewriter frame as is, in accordance with the requirements of the FIGURE 2 line feed mechanism, the line feed solenoid 30. Both solenoids have their armatures 32 connected to levers 33 pivoted on the cross bar as at 34. The lever arms 14 associated with the carriage return and the line feed actions have extensions 35 disposed in front of levers 33 so that, upon energization of the solenoids 29 and 30 associated pawls 21 will be released into the snatch roll 22.

As is conventional the typewriter is provided with a pivotally mounted line lock blade 36 which is adapted to be received in notches 37 formed in the key levers 11 to prevent their depression when the machine is off. The blade 36 is normally maintained beneath the notches 37 by a lever arm projection 38 against the urge of a spring 39 secured to the blade and to a frame mounted stud 40. As is understood when the machine is turned on lever arm projection 38 moves counterclockwise to the position shown in dotted lines thereby permitting spring 39 to move the blade 36 out from beneath notches 37. The lever arm 38 is maintained in dotted position through the action of an armature (not shown) associated with a solenoid in the motor circuit. For further details of the line lock mechanism reference may be made to Patent 2,810,466.

In accordance with the present invention the blade 36 is further adapted to be actuated to a keyboard lock position during times that the line fed key puller solenoid 30 is energized, as will hereinafter appear, by a safety line lock solenoid 42 whose armature 43 is connected to a slotted ear 44 on blade 36; the slot in ear 44 being provided to take up lost motion.

Referring more particularly now to the FIGURE 2 line feed mechanism which is adapted to be operated through an action as disclosed in FIGURE 1 upon energization of solenoid 30, the bell crank 23 associated therewith is shown coupled to one end of a link 45 whose other end is coupled to an arm 46 fixed on a shaft 47 rotatively supported in a frame mounted bracket 48. Shaft 47 fixedly carries a line feed bail indexing arm 49, which serves additionally, in accordance with the present invention as will hereinafter appear, as a program indexing arm. The indexing arm 49 carries a stud 50 slidably mounted in a cutout 52 in one end of an arm 53 whose other end is fixedly secured to a shaft 54 suitably mounted in a typewriter frame mounted bracket 55.

Figure 4:
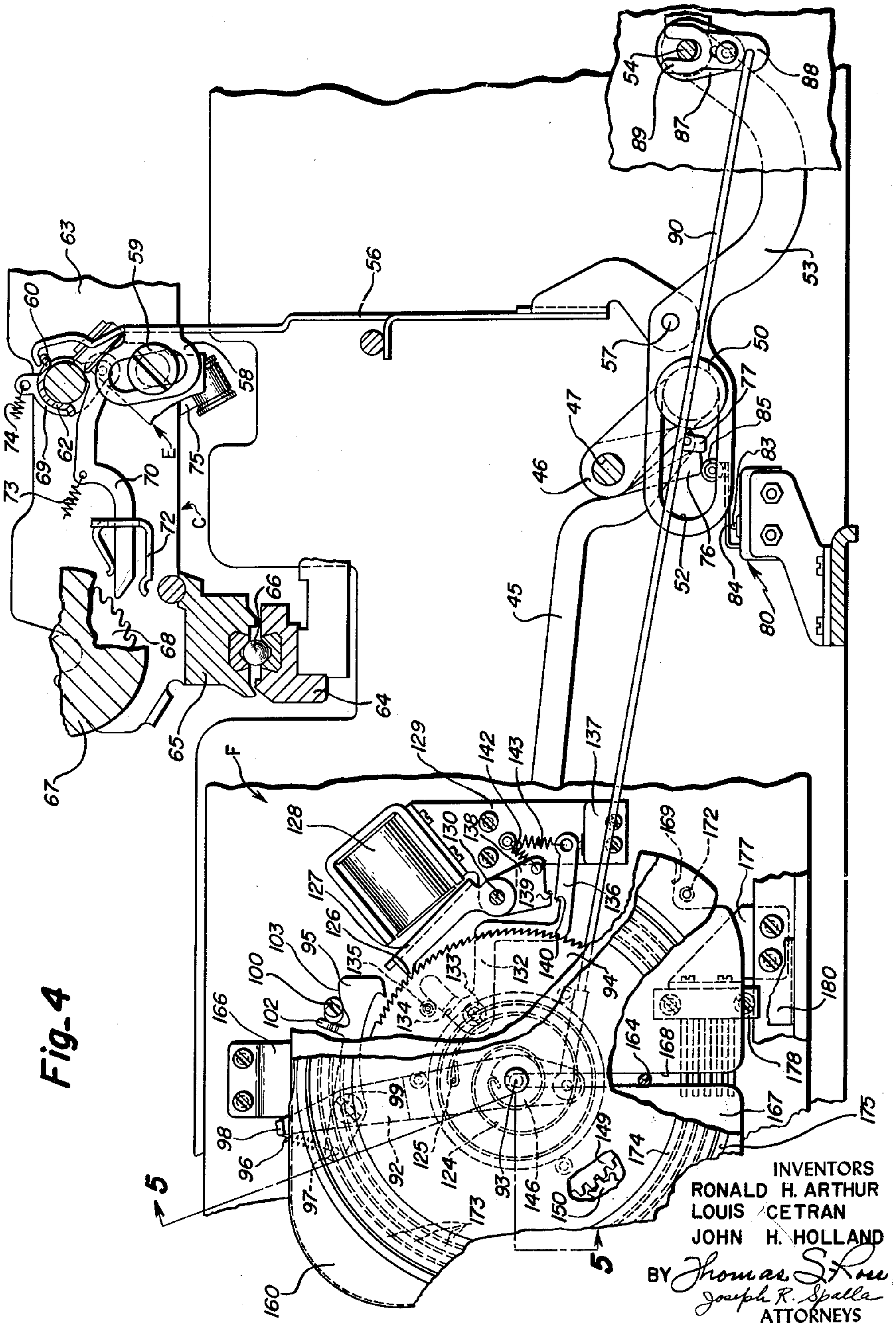
FIGURE 4 is a cross sectional view showing parts of the line feed mechanism of FIGURE 2 and program indexing mechanism associated therewith.

Rotation of shaft 47 and arm 49 clockwise, upon energization of the line feed key puller solenoid 30, causes stud 50 to ride the cutout 52, to move arm 53 downwardly, and to rotate shaft 54 counterclockwise. An upwardly extending bail actuating arm 56 is secured to arm 53 as at 57 and is provided on its upper end with a slotted ear 58 adapted to receive a stud 59 secured to an escapement frame E (FIGURE 4) whereby it is retained in position and guided in its vertical movement by the stud 59. The upper extremity of bail actuating arm 56 is bent over so as to engage a flange 60 on a repeat line space bail 62. As seen in FIGURE 4 bail 62 is rotatively mounted in the end plates 63 of a carriage, generally designated by reference character C, which is mounted for movement transversely of the typewriter frame on a frame mounted lower track or rail 64 by means of a carriage or top rail 65, and ball rollers 66, one of which is shown. The carriage is equipped with the usual cylinder or platen 67 rotatively mounted in the carriage end plates and provided on one of its ends with an indexing ratchet 68. The end of the repeat line space bail 62 adjacent the ratchet is provided with an arm 69 fixedly secured thereto, the lower end of which is pivotally connected to a repeat line space pawl. The pawl 70 is guided by a slotted bracket 72 secured to the carriage top rail and biased by a spring 73 secured to the left carriage end plate 63. A bail return spring 74 is also secured to the bail arm 69 and to the carriage end plate 63.

Other known parts include a carriage return draw band 75, one end of which is secured to a lever (not shown) which carries an index pawl (not shown) adapted to engage the line space ratchet 68 so as to automatically effect single, double, or triple line spacing each time a carriage return operation is initiated. In accordance with the invention a zero line feed set point is provided by extending a shield (not shown) which holds the index pawl out of engagement from the ratchet 68 with the result that no line spacing is effected by the draw band connection. A more detailed disclosure of this mechanism may be had through reference to Patent 2,567,937.

Referring again to FIGURE 2 the line feed mechanism is further comprised, in accordance with the invention, of an interrogate switch actuating arm 76 which has rotatively secured thereto a finger 77 having a bent off ear 78 adapted to ride within a slot 79 in arm 76; slot 79 determining both the clockwise and counterclockwise limits of rotation of finger 77. A form A interrogate switch 80, preferably a microswitch, is mounted on a frame mounted bracket 82. The contact operating button 83 of the switch is adapted to be operated by a resilient member 84 having a roller 85 disposed in the path of finger 77.

As heretofore stated energization of the line feed key puller solenoid 30 will cause shaft 47 to rock clockwise. As arm 76 thereon moves clockwise finger 77 will be engaged by roller 85 and caused to yield counterclockwise and move past the roller 85 without depressing member 84. During the return motion, however, the slot 79 in arm 76 limits the clockwise motion of finger 77 causing it to cam the roller 85 and member 84 downward as it passes thereover, thereby actuating button 83 with the result that switch 80 closes thereby conditioning an interrogate pulse circuit as will hereinafter appear.

Also as shown in FIGURE 2 there is provided a bearing 86 carried by the typewriter frame through which bearing shaft 54 extends. Outwardly of the bearing 86 the shaft 54 fixedly carries an arm 87 to which is pivotally secured an arm 88 having a forked end 89 which straddles shaft 54. A rod 90 is provided with one end secured to arm 88, and its other end secured to a pawl carrier arm 92 pivoted on a shaft 93 secured to the typewriter frame. As seen in FIGURE 4 shaft 93 mounts a program indexing ratchet 94. As seen in FIGURES 2 and 4 the arm 92 pivotally carries a pawl 95 adapted to engage the ratchet 94. The pawl 95 is maintained in its normal position as shown by a motion transmitting spring 96 secured between its tail end 97 and a projection 98 on arm 92. A stud 100 (FIGURE 4) secured to the typewriter frame serves in cooperation with a pawl projection 102 to disengage the pawl as it moves to the right as viewed in FIGURE 4, and in cooperation with a camming surface 103 on the pawl to cam the nose of the pawl into the ratchet as it is moved to the left.

In accordance with the embodiment shown in FIGURE 3 the line feed powering mechanism shown in FIGURES 1 and 2 is not employed but rather the Royal Electric Office Typewriter repeat line space construction, partially shown in FIGURE 3 and more particularly described in Patent 2,728,438, is modified for operation by the line feed key puller solenoid 30′ which, in this embodiment, is suitably mounted on the typewriter frame with its armature 104 connected so as to move a cam follower generally designated by reference numeral 105. The solenoid 30′ in this embodiment is still adapted to be energized upon closure of the switches 28 (FIGURE 1) operable by keys 24, 25, 26 and 27.

As more specifically disclosed in Patent 2,728,438 the repeat line space mechanism comprises a two lobed cam 106 adapted to be driven continuously by means of belt connected pulleys; the driving force being provided by a motor driven shaft 107.

The cam follower 105 includes an arm 108 the rear end of which is comprised of a U-shaped part 109 which is mounted both to rock and to slide on a fixed shaft 110 which extends parallel to the cam axis of rotation. A normalizing spring 112 interposed between the follower arm and a collar 113 fixed on the shaft 110 urges the cam follower toward the left to the position shown in FIGURE 3 in which a cam follower roller 114 on the arm 108 is displaced from the plane of cam 106 so as not to be engageable by the cam. When the parts are positioned as shown in FIGURE 3 the follower arm 108 is held up against a stop 115 by a spring 116, the stop 115 so determining the upper or normal position of the follower roller 114 that the roller is closer to the cam axis than is the highest or most radially outward portion of either of the two cam lobes; the follower roller 114 however, being further from the cam axis of rotation than the peripherally innermost portions of the cam between its lobes. As will be understood the cam follower 105 is adapted to be moved into engagement with the cam 106 by energization of solenoid 30′ which is adapted to rock a lever 117 pivoted at 118 on the typewriter frame. The rear end of lever 117 is formed with an ear 119 which is connected to the cam follower U-shaped part 109 by a yieldable motion transmitting spring 120; the arrangement being such that when lever 117 is rocked clockwise by energization of solenoid 30′, the spring 120 will yieldably pull the cam follower 105 toward the right against the urge of the normalizing spring 112 to position the roller 114 in the plane of the cam. The forward end of the cam follower arm is connected to the lower end of the bail actuating lever arm 56 whereby the platen may be indexed as described with reference to FIGURE 4.

The program is indexed as shown in FIGURE 3 by the provision of an upwardly projecting extension 122 on the base of the U-shaped part 109 which is adapted to rock a spring biased crank arm 123 secured to shaft 54 whereby shaft 54 is, as it was in FIGURE 2, rocked counterclockwise. The equivalent of the interrogate switch 80 of FIGURE 2, designated 80′ in FIGURE 3, is suitably mounted beneath the cam follower arm 108 whereby it is operated at the end of platen indexing movement.

*Vertical program unit*

Figures 5, 10:
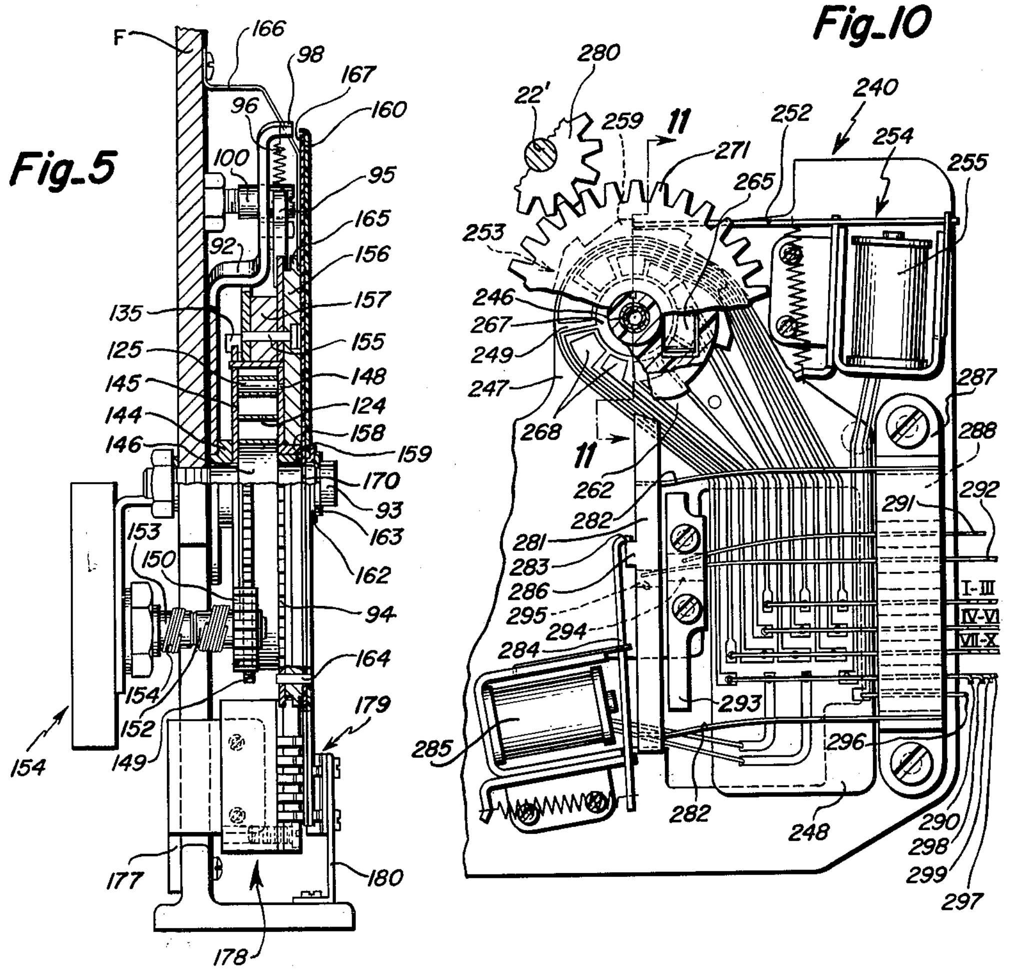
FIGURE 5 is a cross sectional view taken along lines 5—5 of FIGURE 4.
FIGURE 10 is a side view of a switching device.

Referring now to FIGURES 4 and 5 there is shown a spiral ratchet wheel return spring 124 behind the ratchet wheel 94 with one of its ends secured to shaft 93 and the other to the ratchet wheel by a stud 125 (FIGURE 4). As the ratchet wheel 94 is indexed counterclockwise the spring 124 will store energy. The ratchet wheel 94 is retained in successively indexed positions by a detent 126 formed on the armature 127 of a release solenoid 128 mounted on a frame mounted bracket 129. The armature is pivotally mounted on bracket 129 as at 130. A latching member 132 pivotally mounted on the typewriter frame as at 133 is provided with a bent off extension 134 adapted to be engaged by a stud 135 on the ratchet wheel assembly for reasons which will hereinafter appear. The latching member is also provided with an extension 136, the end of which is adapted to operate, in a manner which will hereinafter appear, a form C microswitch 137 mounted on bracket 129. The lower end of armature 127 has an extension 138 formed with a shoulder 139 adapted to cooperate with a shoulder 140 on the extension 136 of latching member 132 whereby when release solenoid 128 is energized armature 127 will be latched and the movable contact of switch 137 moved to and maintained in its other than normal position. Springs 142 and 143 connected at one end to bracket 129 and at opposite ends to armature extension 138 and latch arm extension 136, respectively, are provided to return armature 127 to detenting position as shown and to bias latch arm extension 136 into engagement with armature extension 138 and against stud 135. In the home position shown switch 137 is in its normal position and remains so even after stud 135 moves away from extension 134 during indexing movement. The counterclockwise movement of latching member 132 under the influence of spring 143 is limited by the engagement of extension 136 with armature extension 138.

Referring now more particularly to FIGURE 5 the manner in which shaft 93 is secured to typewriter frame F and the elements carried thereby are shown in detail. As seen the pawl carrier arm 92 is mounted on a spacing bushing 144 rotatably mounted on shaft 93. Outwardly of the spacing bushing 144 is a housing 145 for the spiral spring 124 which as heretofore stated is secured to the stationary shaft 93; more particularly to an annular shoulder 146 formed thereon and to stud 125 secured to ratchet wheel 94 as at 148 (FIGURE 5). Mounted about the spring housing is a gear 149 adapted to mesh with a pinion 150 associated with a shaft 152. Shaft 152 is adapted to be coupled to a second shaft 153 aligned therewith by a helical wrap spring 154. Shaft 153 is coupled to drive a centrifugal braking device generally designated by reference 154, many of which are known to the art. The purpose of the braking device 154 is to control the rate of return of the ratchet wheel to home position (as shown) as will hereinafter appear. The gear 149 is secured to the ratchet wheel 94 by a stud 155 which extends from a spacer 156 outwardly of the ratchet wheel, through the ratchet wheel, a spacer 157 and the gear 149.

The ratchet wheel 94 is formed with an outwardly extending hub 158 which supports spacer 156. Within hub 158 is a bushing 159. Outwardly of spacer 156 and separated therefrom is a program plate 160 having a central opening within which is secured a flanged bushing 162. A lock spring 163 is secured in a groove in shaft 93 and in abutting relationship to the flange on bushing 162. The program plate 160 is connected for rotation with the ratchet assembly by pin 164 which extends from the ratchet wheel, through the spacer 156 and into the program plate. As seen in FIGURE 4 pin 164 is located vertically below the axis of shaft 93.

Figure 6:
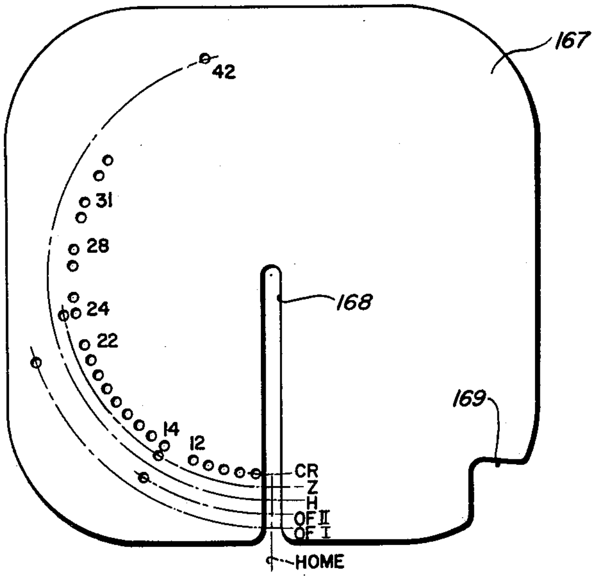
FIGURE 6 is a view of a vertical program disc.

As further seen in FIGURE 5 the spacer 156 is formed with an annular peripheral projection 165. A resilient cover plate 166 secured to the typewriter frame F extends downwardly and rearwardly of program plate 160 for a distance such that it abuts the outwardly facing shoulder formed by projection 165. This spring plate 166 acts to bias a program disc 167 toward the program plate 160. The program disc 167 as seen in FIGURE 6 is shaped with an open slot 168 extending radially from its center and with one of its corners 169 cut away. The slot 168 is to permit the program disc to be inserted between the spacer 156 and the program plate 160; shaft 93 having a groove 170 to receive the edges of the slot. The pin 164 which drives the program plate also drives the program disc through contact with the edges of slot 168 as shown in FIGURE 4. A pin 172 (FIGURE 4) extending inwardly from the program plate 160 is adapted to cooperate with the cut away corner 169 to assure that the program disc can only be inserted right side out, and only inserted and/or removed when the ratchet is in a home position.

The program plate 160 (FIGURE 5) is made from insulating material in accordance with well known printed circuit techniques. As most clearly shown in an exaggerated view of the program plate in FIGURE 12 the inwardly facing side has five tracks 173 of conductive material deposited thereon which are designated carriage return, zone, home, overflow II and overflow I. The outwardly facing side has two tracks, 174 and 175, and the wider one, 174, is electrically connected by suitable means such as rivets 176 to all of the tracks 173 with the exception of the overflow I track which is electrically connected to the track 175.

As is apparent from FIGURES 4 and 5 the tracks are radially spaced from the axis of the ratchet to permit the mounting on a bracket 177 (FIGURE 5) of a brush assembly 178 on one side of plate 160 beneath the indexing ratchet 94 and a brush assembly 179 (FIGURE 5) supported by a bracket 180, on the other side. The brush assemblies 178 and 179 schematically shown in FIGURE 12 comprise wire brushes 181 and brushes 182, respectively, having V bends at one end and mounted so that the point of the V resiliently rides the conductive tracks 173, 174 and 175.

As seen in FIGURE 6 the program disc 167 is adapted to be perforated in selected successive index positions clockwise from a home position in each of five tracks designated carriage return (CR), zone (Z), home (H), overflow II (OFII) and overflow I (OFI) which tracks are positioned adjacent the tracks 173 in the program plate 160 when the disc is operatively inserted as shown in FIGURES 4 and 5.

*Tabulating mechanism*

Figure 7:
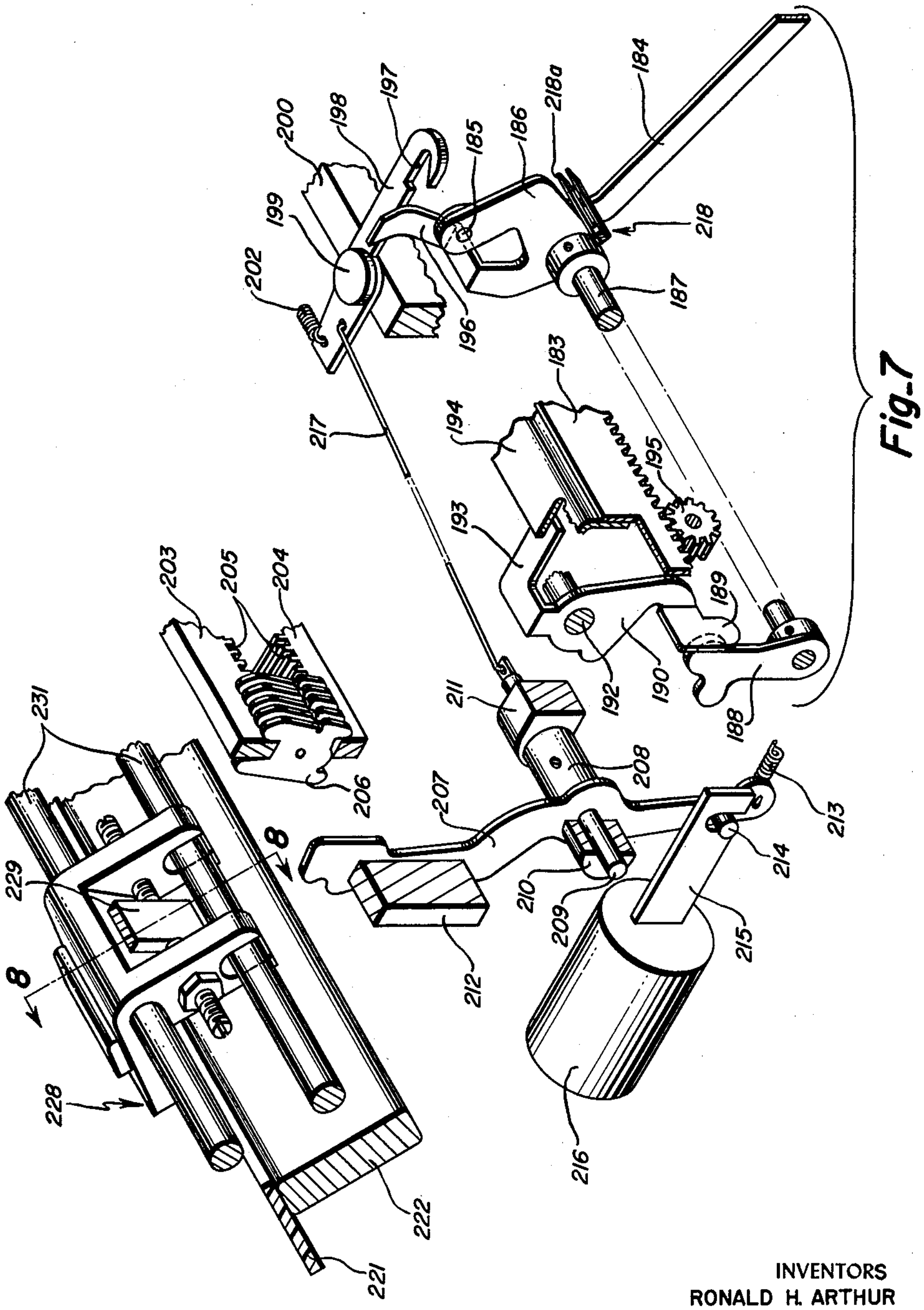
FIGURE 7 is a perspective view of tabulating and horizontal programming mechanism in accordance with the invention.

The tabulating mechanism for raising the carriage rack 183 to permit movement of the carriage, free of restraint by the escapement in a letter spacing direction, is partially illustrated in FIGURE 7 wherein is shown a tabular link 184 adapted to be actuated through connection with an associated bell crank 23 (FIGURE 1). Upon depression of the typewriter tabulator key, link 184 will be pulled forwardly or to the right as viewed in FIGURE 7 against the force of an associated return spring (not shown). Link 184 is pivotally connected as at 185 to a lever arm 186 fast on a shaft 187 mounted in the typewriter frame whereby as link 184 moves forwardly shaft 187 is rocked clockwise. Shaft 187 has secured thereto a rack bar lifting lever 188 adapted to engage an ear 189 on, and to rock counterclockwise, a rack bar lifting arm generally designated 190 pivoted as at 192 on escapement frame E, partially shown in FIGURE 4, and having an upper arm 193 extending under a rack rail 194. When arm 190 rocks counterclockwise as viewed in FIGURE 7 the rack 183 is moved out of engagement with an escapement pinion 195 thereby freeing the carriage for movement by the spring motor in letter space direction.

Lever arm 186 is also provided with an extension 196 adapted to be engaged by a slot 197 formed in a latch member 198 pivoted at 199 on a bracket 200 secured to the typewriter frame. A spring 202 interposed between the rear end of member 198 and an ear (not shown) on the bracket 200 urges latch member 198 to rock clockwise as viewed in FIGURE 7 so that when shaft 187 rocks clockwise, extension 196 will move forwardly until it reaches slot 197 whereupon spring 202 will pivot latch member 198 clockwise, latching lever arm 186 and shaft 187 in actuated position whereby the rack 183 will be held out of engagement with the escapement pinion 195.

The tabulation mechanism also includes a support mounted on the carriage comprising upper and lower rack bars 203 and 204, respectively, formed with aligned transverse grooves 205 which are spaced longitudinally of the rack bars at letter space intervals. A plurality of tabular stops 206 are mounted in the grooves of the rack bars and all are set in and normally remain in a set or operative position to engage a tabulation terminating interposer when the latter is in its operative position as will hereinafter appear. Such an arrangement constitutes a "solid" tab rack. In the form shown the tabulation terminating interposer is constituted by a tabular stop blade 207 having a boss 208 secured by a set screw to blade mounting means comprising a shaft 209 mounted for both axial and rocking movement in bearing lugs 210 and 211 on a bracket 212. The tabular stop blade 207 is normally biased out of engagement of the tab rack by a spring 213 suitably secured thereto and to the typewriter frame. The tabular stop blade is adapted to be moved into the path of a tabular stop 206 through connection as at 214 with the armature 215 of a solenoid 216 suitably mounted on the typewriter frame. The tabulation terminating interposer or tabular stop blade 207 is also connected by a link 217 to latch member 198 thereby to actuate the latch member 198 and permit the rack 183 to re-engage the escapement pinion 195 as will hereinafter be more fully explained. In the normal position of the parts the tabular stop blade abuts bracket 212 and boss 208 is axially spaced from bearing lug 211; spring 202 being ineffective to move blade 207 axially to the right through link 217 because of the abutment of extension 196 with latch member 198.

The above arrangement of parts differs from the Royal Electric Typewriter in that a "solid" tab rack is provided and the tab stop blade 207 is solenoid actuated rather than being linked to rock shaft 187.

Further in accordance with the invention a form A tab latch switch 218 is provided on the typewriter frame and disposed thereon as shown so as to move the movable contact 218*a* thereof to its closed position by movement of lever arm 186 to actuated position.

*Tabulating program unit*

Figure 8:
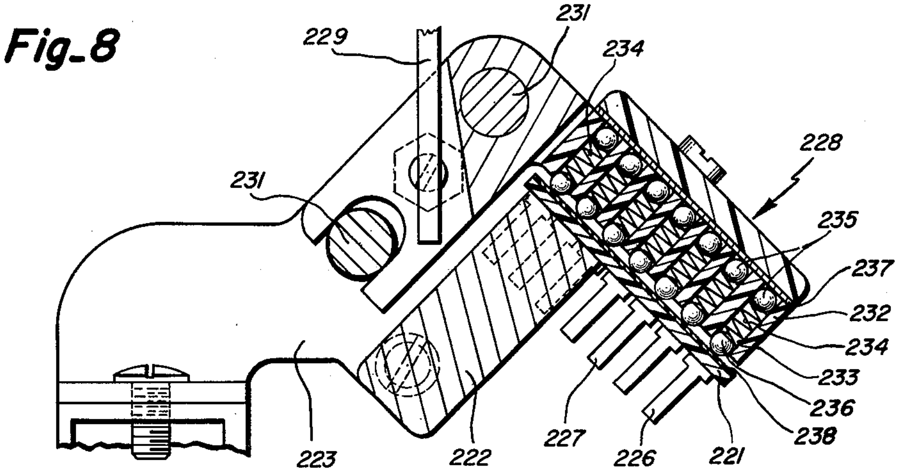
FIGURE 8 is a cross sectional view taken along lines 8—8 of FIGURE 7.
Figures 9, 11:
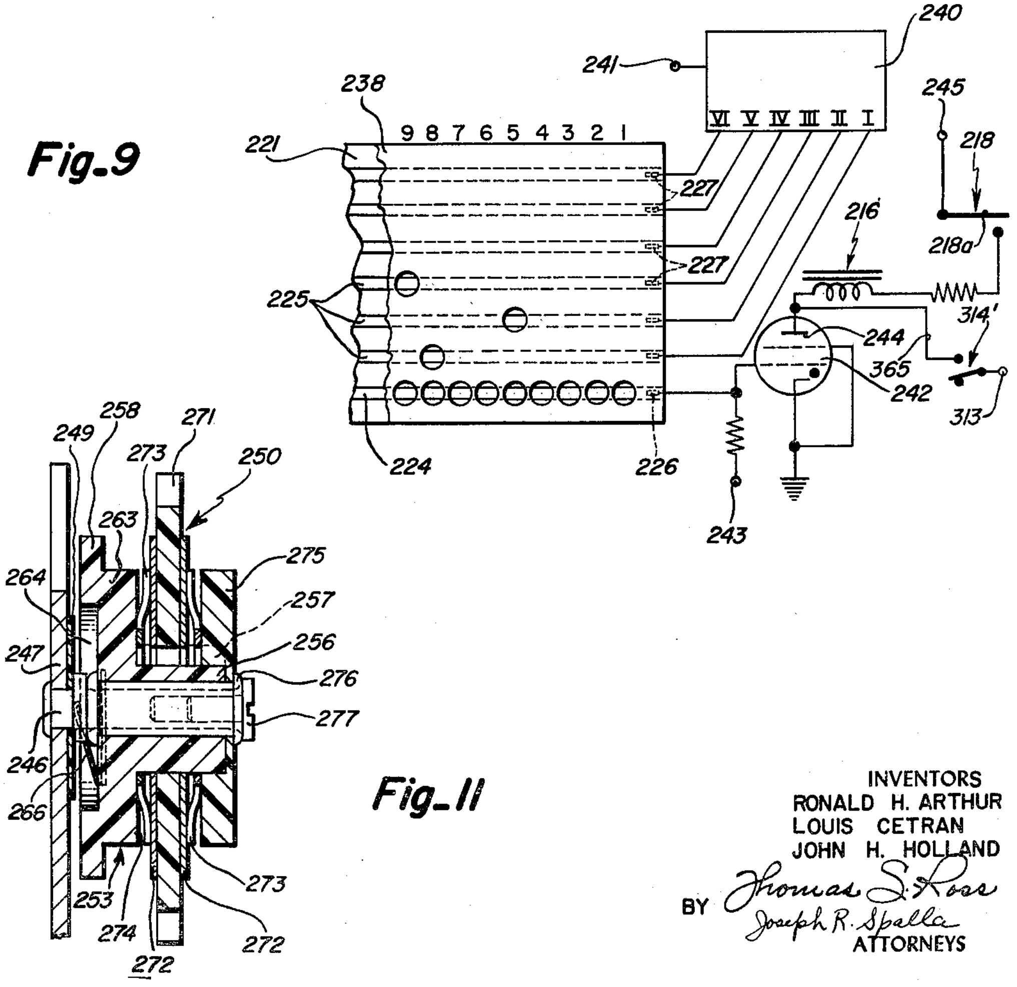
FIGURE 9 is a plan view of the horizontal program and control circuitry associated therewith.
FIGURE 11 is a cross sectional view taken along lines 11—11 of FIGURE 10.

In accordance with the invention a longitudinally disposed program plate 221 is suitably secured to a bar 222 which is secured at either end to brackets 223, one of which is shown in FIGURE 8, fixed on the typewriter frame. The program plate preferably carries printed circuitry comprising as seen in FIGURE 9 a common longitudinally disposed conductor 224 and a plurality of individual printed conductors 225 corresponding to zones on a form as will hereinafter be explained. The common conductor 224 is connected to a terminal 226 riveted to the plate 221 as are each of the individual conductors to terminals 227. A sensing device generally designated 228 (FIGURES 7 and 8) is mounted for movement with the carriage by an arm 229 secured to and depending from the carriage top plate (not shown) and is guided on frame mounted rails 231. As seen in FIGURE 8 the sensing device comprises an insulating block 232 having spaced bores 233 wherein are disposed springs 234 adapted to bias contact balls 235 and 236 at either end respectively, against the printed circuits on the program plate 221 and a contact plate 237. The balls function as movable switch contacts as will hereinafter appear.

The spacing of the bores is such that balls 236 are disposed immediately over the printed conductor tracks on the program plate 221. As shown in FIGURES 8 and 9 a template 238 of insulating material is adapted to be inserted between the balls 236 and the program plate. The template as shown in FIGURE 9 is perforated over the common conductor 224 in every position corresponding to every tabular stop position; and is selectively perforated over each of the individual conductors 225 in accordance with desired tabular stop positions within a zone on a form.

Referring more particularly to FIGURE 9, the terminals 227 of the individual conductors 225 are connected to output terminals I, II, III, IV, V and VI of a switching device, generally designated by reference numeral 240 and more particularly disclosed with reference to FIGURES 10 and 11. Terminals I–VI are adapted to be connected one at a time to a positive voltage source 241. Each time the switching device is pulsed as will hereinafter appear a succeeding one of terminals I–VI will be connected to source 241. Consequently only one of the individual conductors 225 will be connected to power at any one time. As may be seen the common conductor terminal 226 is connected to the grid of a thyratron 242 which is normally biased below its firing potential through connection to a bias supply terminal 243. The plate 244 of the thyratron is adapted to be connected to a plate voltage supply terminal 245 through the tab blade control solenoid 216 and the tab latch switch 218.

As is evident from the above, as the carriage moves in letter space or tabulating directions, balls 236 will encounter perforations; and when a perforation is encountered over the individual track 225 then energized, as determined by the position of the switching device 240, a circuit will be completed from power source 241 to the common conductor 224; the contact plate 237 bridging the ball 236 in contact with the energized individual conductor 225 and the ball in contact with the common conductor 224.

In operation when a tabulation operation is initiated, link 184 will rock shaft 187 as heretofore explained. This will cause rack 183 to be lifted from the escapement pinion, extension 196 of latch lever 186 to engage the slot 197 in latch member 198 whereby the rack will be held out of engagement from the escapement pinion, tabular stop blade 207 to move axially to the right into abutment with bearing lug 211 under the action of spring 202, and tab latch switch 218 to close thereby connecting plate supply voltage to the thyratron 242 conditioning it for firing upon receipt of a signal on its grid. The carriage will therefore move until the ball sensing device through perforations in template 238 bridges an energized individual conductor 225 corresponding to a desired zone position on the form being typed i.e. one which is connected to power supply 241, and the common conductor 224. The grid of the thyratron will rise above the tube firing potential, the thyratron 242 will fire and the tab lever control solenoid 216 will be energized. Energization of the solenoid will move the tabular stop blade 207 between tab stops 206 and immediately before the tab stop 206 corresponding to the tabular position on the form to which carriage movement was desired. The tab stop 206 will engage the tubular stop blade 207, moving it against bracket 212 thereby arresting movement of the carriage. Movement of the tabular stop blade 207 axially to the left as viewed in FIGURE 7 will pull latch member 198 thereby unlatching lever arm 186, and rack bar lifting lever 188 whereupon the rack 183 re-enegages the escapement pinion 195 and the tab latch switch 218 opens. The opening of switch 218 de-energizes solenoid 216 whereupon tab lever 207 moves out of the path of the tab stop 206.

*Vertical to horizontal switching unit*

As heretofore disclosed each time the vertical program zones, a new horizontal program track 225 is rendered effective. This is accomplished by the switching device 240 shown in FIGURE 10. The device comprises as most clearly seen in FIGURE 11 a stub shaft 246 fixedly secured to a mounting plate 247. Riveted to the mounting plate is a printed circuit card 248 (FIGURE 10), a circular portion 249 of which has its center aligned with the axis of the stub shaft. Immediately in front of the circular portion 249 of the card 248 is an assembly, generally designated by reference 250 (FIGURE 11), mounted for rotation about the stub shaft but which is normally held against rotation by a detent 252 (FIGURE 10) cooperating with a ratchet member of the assembly generally designated by reference numeral 253. The detent is an extension of the armature 254 of a stepping solenoid 255 suitably secured to the mounting plate 247.

The ratchet member 253 as shown in FIGURE 11 is constituted by a hub 256 having a keyway 257 formed therein, and is also formed with a first and a second flange on the end adjacent plate 247. The first or outermost flange 258 is formed with a plurality of teeth 259 (FIGURE 10) which cooperate with armature detent 252 to limit rotation of the ratchet member. A camming step 262 (FIGURE 10) is formed on the periphery of the second flange 263 next adjacent the hub 256 for reasons which will hereinafter appear. The flanged end is also provided with a cutout 264 adapted to receive a wire brush support 265 (FIGURE 10) whereby wire brushes 266 (FIGURE 11) supported thereby engage the printed circuit card portion 249 so as to connect a common printed circuit conductor 267 (FIGURE 10) with successive printed circuit segments 268 as the ratchet is rotatably stepped. Although the illustrated structure shows ten segments 268 thereby providing for ten switching positions, it is to be understood that a lesser or greater number may be provided.

Referring again to FIGURE 11 there is shown a gear 271 rotatably mounted on the hub 256. Outwardly of each side of the gear and keyed to the hub is a friction plate 272 and a spider spring 273 adapted to urge the friction plate toward the gear. The spider springs are kept under stress between the shoulder 274 formed by flange 263 and an outer member 275 also keyed to the hub. The whole assembly is secured together by a hollow rivet 276 which is rotatably mounted on and maintained on the stub shaft by a screw 277 threaded into the shaft.

As will be apparent if the ratchet member 253 is free to rotate, as when the detenting armature 254 is lifted out of the teeth 259 thereof, the whole assembly 250 will rotate about stub shaft when gear 271 is rotated; the friction plates 272 transmitting the drive to the ratchet member 253. When, however, the ratchet member 253 is restrained, the gear 271 alone will rotate, the friction plates 272 being unable to prevent slippage. As shown gear 271 meshes with a driving gear 280 which is suitably connected to a continuously rotating member in the typewriter such as the power roll shaft 22' (FIGURE 1).

The camming step 262 (FIGURE 10) on ratchet member flange 263 is adapted to cooperate with a slide 281 normally biased toward the step by leaf springs 282 but retained in a down position against the spring force by a bent over end 283 of the armature 284 of a home solenoid 285; end 283 engaging a ridge 286 formed on the slide. As shown in FIGURE 10 the leaf springs are anchored to a bracket 287 secured to the mounting plate. The bracket mounts an insulating block 288 which anchors a wire 290 and a plurality of wires I–X connected respectively to the printed circuit common 267 and printed circuit conductors integral with the printed circuit segments 268. The insulating block also anchors two wires 291 and 292 whose free ends are adapted to contact one another when slide 281 is released upon energization of the home solenoid 285 and to remain in contact until the ratchet member 253 is returned to a home position as determined by the camming step 262. As seen in FIGURE 10 the free end of wire 291 extends into a slot 294 in an insulating block 293 secured to the mounting plate 247 whereby the free end of wire 291 is biased downwardly as shown. The free end of wire 292 also extends through slot 294 and into a slot 295 in the slide 281 whereby it is biased downwardly out of contact with the free end of wire 291. This arrangement constitutes a form A switch, generally designated 300 in FIGURE 12, normally mechanically latched as shown.

In accordance with the invention power is connected to the common printed conductor 267 through wire 290 connected thereto and the wires I–VI connected to the printed circuit segments 268 are adapted to be connected respectively to the terminals 227 of the six printed circuit tracks 225 provided on the horizontal program plate 221. Normally wire I will be energized thereby rendering the track 225 (FIGURE 9) associated therewith "hot." As will be more particularly described hereinafter power is adapted to be supplied to the step solenoid 255 via wires 296 and 297 and to the home solenoid via wires 298 and 299, all of which are supported by insulating block 288, and connected via associated printed conductor circuitry on card 248.

Figure 12:
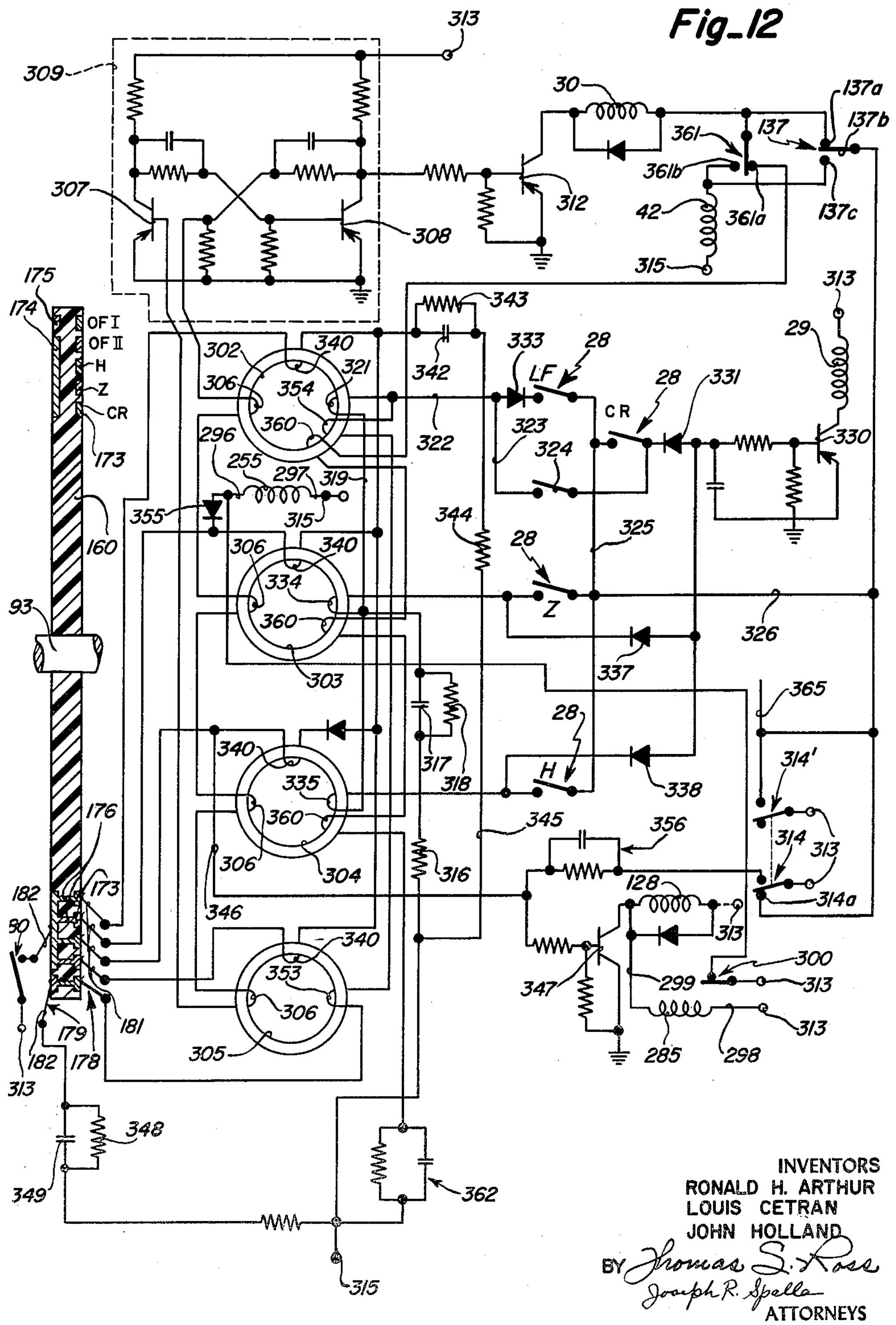
FIGURE 12 is a schematic diagram of the vertical programming unit control circuitry.

Referring now to FIGURE 12, there is shown the vertical format control circuitry and the manner in which it is associated with the skip and home solenoids of the switching device 240 whereby the selection of a horizontal format for a particular vertical zone is effected and whereby the correct horizontal format is maintained synchronized with a particular vertical zone during movement from form to form.

More particularly the circuitry for controlling form progress in a vertical direction comprises a carriage return core 302, a zone core 303, a home core 304, and an overflow core 305. Each of these cores is made from materials known to the art which have a rectangular B-H characteristic. As is understood by persons conversant with the art each of these cores has two stable states corresponding to the positive and negative residual magnetism remaining in the cores after removal of positive and negative magnetomotive forces respectively. When in a positive residual magnetic state, a negative magnetizing force will be effective to flip the core to its negative residual state and vice versa. In accordance with the invention the positive residual state is referred to as the set condition and the negative residual state as the reset condition.

As seen in FIGURE 12 each core is provided with an output winding 306. All of the output windings are connected in series and one terminal of the serially connected windings is connected to the base electrode of a PNP transistor 307 which together with a PNP transistor 308 comprises a flip-flop circuit 309. The other terminal of the serially connected windings is connected to the collector electrode of transistor 308. The collector electrode of transistor 308 is connected to the base electrode of a PNP transistor amplifier 312 whose collector is connected to a negative supply terminal 313, via line feed key puller solenoid 30, the normally closed contacts 137*a* and 137*b* of the switch 137 operated upon energization of release magnet 123 (FIGURE 4) and the contacts 314*a* made by depression of an on-off switch 314 to "on" position. The flip-flop transistors are so connected as is understood by persons skilled in the art that transistor 307 is normally not conducting and transistor 308 is normally conducting. Consequently transistor 312 is normally not conducting. Whenever one of the cores is flipped to a set condition, a negative pulse is induced in its associated output winding 306 thereby rendering PNP transistor 307 conductive, transistor 308 non-conductive, and transistor 312 conductive. Conduction of transistor 312 will thereby effect the energization of the line feed key puller solenoid 30, assuming of course that the normally closed contacts 137*a* and 137*b* are closed.

The carriage return core 302 is adapted to be set upon manual depression of line feed key 24 or by carriage return key 25 on the typewriter keyboard (FIGURE 1). Similarly the zone and home cores 303 and 304 are adapted to be set upon depression respectively of zone key 26 and home key 27 (FIGURE 1). As will hereinafter be more fully disclosed the overflow core 305 is adapted to be set upon depression of the carriage return or the line feed key if either of these keys is actuated at the completion of typing on the last line in a zone being typed.

More particularly the circuit established by depression of the carriage return key causes current to flow from a positive supply terminal 315, a resistor 316, a pulse forming circuit comprising a capacitor 317 shunted by a resistor 318, a conductor 319, a set winding 321 on the carriage return core 302, conductors 322 and 323, the latter line including a normally closed manually operable switch 324, through the contacts of the carriage return key operated switch 28, conductors 325 and 326 and to the negative supply source 313 through the on contact 314*a* of the on-off switch 314. Closure of carriage return switch 28 also connects, through conductors 325 and 326, the negative supply source 313 to the base electrode of a PNP transistor 330 through a properly poled isolating diode 331, causing transistor 330 to conduct and to energize the carriage return key puller solenoid 29 (FIGURE 1) in its collective circuit whereby as will be understood the carriage return clutch will be engaged and latched during return movement of the typewriter carriage.

The circuit established by depression of the line feed key is from positive supply terminal 315 through the set winding 321 of the carriage return core over the path previously described for carriage return, conductor 322, diode 333, the closed contacts of the line feed key operated switch 28 and to the negative supply terminal 313 via conductors 325 and 326. As seen in FIGURE 12 the anode of diode 333 is connected to the cathode of isolating diode 331 through switch 324 when switch 324 is closed thereby applying, when the line feed switch 28 closes, a negative potential to the base of transistor 330 thereby energizing the carriage return solenoid 29. If a line feed without a carriage return, or a carriage return without a line feed is desired the manual switch 324 may be opened.

The circuit established by depression of the zone or the home key controlled switch 28 is from terminal 315 to their respective set windings 334 or 335 through the pulse circuit comprising resistor 318 and condenser 317, the switch 28 associated therewith and to the negative supply source 313 via conductor 326. Closure of the home or zone switches 28 also causes transistor 330 to conduct to effect a carriage return operation inasmuch as the base of transistor 330 is connected to the stationary contact of the zone and home switches 28 through properly poled diodes 337 and 338 associated with zone and home respectively.

As heretofore stated whenever one of the cores is flipped to a set condition, the pulse on its associated output winding 306 will cause the line feed solenoid 30 to be energized which in turn will initiate line feed operation, and due to the mechanical coupling heretofore described advance the program disc 167 one step for each line feed. Also at the end of each line feed the interrogator switch 80 is caused to close momentarily.

If when the interrogator switch closes, one of the carriage return, zone, home, or overflow II brushes 181 is in contact with its associated track 173 through a hole in the program disc, a circuit will be completed from negative supply terminal 313, switch 80, brush 182, the program plate track 174 and the track 173 contacted by a brush 181, through an associated reset winding 340, a reset pulse forming circuit comprising capacitor 342 and resistor 343, a resistor 344 and a conductor 345 to positive supply terminal 315. The resulting interrogate pulse will pass through the reset winding of the core associated with the particular brush 181 contacting a track 173, and if that core was previously set the resulting pulse in its output winding 306 will flip the flip-flop 309 back to its normal state thereby causing solenoid 30 to be de-energized and line feed operation to halt.

When a home program hole is sensed not only is the home core 304 reset, if previously set, but the interrogator pulse is also effective over a conductor 346 to render a transistor 347 conductive thereby simultaneously energizing home solenoid 285 and release solenoid 128. Energization of release solenoid 128 causes contacts 137*a* and 137*b* to be latched open as described with reference to FIGURE 4, and since these contacts are connected in the collector circuit of transistor 312 the line feed solenoid drops out. The contacts remain latched open until the program disc can return to its home position which return, through spiral spring 124 (FIGURE 4) is permitted by solenoid 128 removing and latching detent 126 from ratchet 94. Upon return to home position contacts 137*a* and 137*b* are unlatched by the action of stud 135 on extension 134 as heretofore described, reconditioning transistor 312 for conduction upon receipt of a signal on its base electrode and effecting the re-engagement of detent 126 with ratchet 94. The energization of home solenoid 285 releases slide 281 which moves toward flange 263 of the ratchet member. The movement of slide 281 also closes the form A switch 300 which connects power across the step solenoid terminal wires 296 and 297. Step solenoid 255 remains energized for as long as switch 300 remains closed thereby permitting the ratchet member to be rotated. The ratchet member rotates until the camming step 262 thereon pushes slide 281 downwardly; the latter movement causing it to be latched by armature 284 of the now de-energized home solenoid. The movement of slide 281 also opens switch 300 thereby de-energizing step solenoid whose armature re-engages a tooth 259 in the ratchet member. The position at which this occurs is the home position whereat printed circuit conductor 267 is effectively connected to the printed circuit segment 268 associated with wire I by brush 266.

Movement of the form in the typewriter to the last line in a particular zone and the program disc 167 to the corresponding position presents a hole to the overflow I brush 181. Such a hole will be perforated at a position in the program disc corresponding to the last line of a particular zone on the form wherein there is likely or expected to be more information than can fit into the zone space allotted. If after completing the last line in such a zone and more information of the class of information that is to be typed in that zone remains, an operator might inadvertently attempt a carriage return or line feed and resume typing in the next following zone designed for a different class of information. To prevent this from happening, should an operator depress the carriage return or line feed key after completing typing on the last line of a zone, the form will be caused to move into an overflow zone on the next sheet i.e. the corresponding zone in the next sheet or out of the machine if cut forms are being used. More particularly closure of the line feed or carriage return key operated switch after completing the last line of typing allotted to a zone, completes a circuit whereby the overflow core 305 will be set and line feed operation initiated. More particularly the circuit will be between positive supply terminal 315 through an overflow set pulse circuit comprising resistor 348 and capacitor 349, brush 182 associated with track 175, across to the overflow I track 173 on the program plate 160, brush 181 associated with the overflow I track, a set winding 353 on the overflow core 305 and a second reset winding 354 on the carriage return core 302 to the negative supply terminal 313 through the carriage return or line feed switch 28 as heretofore described. A current pulse will also flow through the carriage return set winding 321 as before due to closure of the carriage return or line feed switch 28. The resultant flux in the carriage return core 302 however will be zero leaving only the overflow core 305 set; the resultant pulse induced in overflow core winding 306 effecting the energization of line feed solenoid 30. Hence line feed operation will be initiated and continue until a home position hole is sensed thereby effecting via conductor 346 the energization, as before described, of release solenoid 128 whereby it opens release contacts 137*a* and 137*b* thereby breaking the collector circuit of transistor 312 and stopping line feed operation. When release contacts open they are mechanically latched open as heretofore described through cooperation of shoulders 139 and 140 (FIGURE 4). Shoulders 139 and 140 also cooperate to latch the release solenoid armature out of the ratchet allowing the return spring 124 to return the program disc 167 to home position at which time stud 135 on the ratchet 94 unlatches the armature 127 enabling the tooth 126 thereon to re-engage the ratchet 94 and also to unlatch release contacts 137*a* and 137*b*. Reclosure of release contacts 137*a* and 137*b* effects the re-energization of the line feed solenoid 30 inasmuch as the overflow core was not reset, nor was the flip-flop 309 reset when a home hole was sensed. Line feed will therefore resume and continue until the overflow core 305 is reset by a hole sensed in the program disc opposite the overflow II track 173. When this occurs an interrogate pulse will pass through reset winding 340 on the overflow core and the resulting pulse in output winding 306 will cause solenoid 30 to be de-energized.

As shown in the circuit diagram the step solenoid 255 has its terminals 297 and 296 connected respectively to positive source terminal 315 and to negative source terminal 313 via the interrogate switch 80 through the program plate and a diode 355 when the zone brush 182 encounters a zone hole in the program disc. Hence when a zone hole is sensed step solenoid 255 will be energized and will effect or permit the movement of ratchet member 253 one tooth whereby brush 266 will connect the common printed conductor 267 with the next successive segment 268 associated with wire conductor II, thereby rendering track 25 associated therewith "hot," etc.

The step solenoid 255 is also adapted to be energized through switch 300 as heretofore described when a home track hole in the program disc is encountered in order that the switching device 240 may also be returned to home position as the form moves to the home position in a succeeding sheet of the form.

Figure 13:
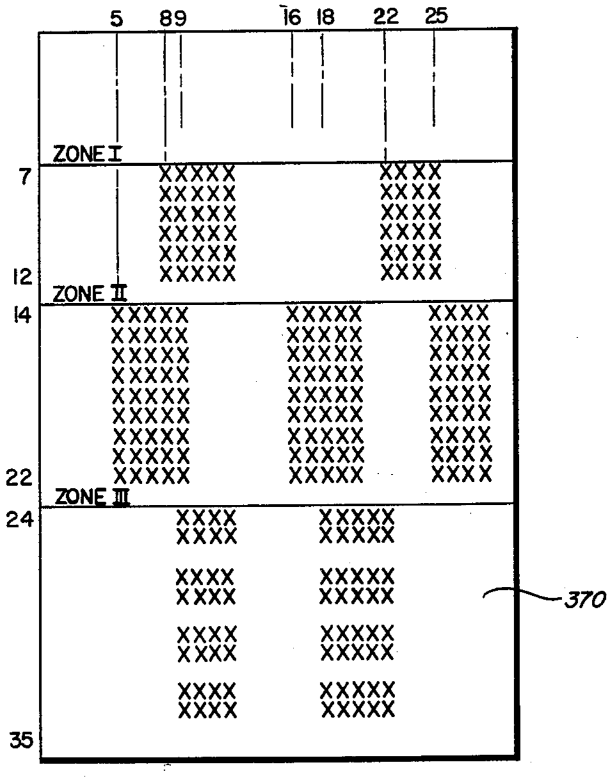
FIGURE 13 is a view of a form showing a sample vertical and horizontal format to explain the system operation.

Referring now to FIGURE 13 there is shown a form generally designated by reference numeral 370 which may comprise one or several sheets. In the example shown it will be perceived that a sheet has thirty-five lines and is adapted to carry three different classes of information in three different vertical zones designated I, II and III. The lines preceding zone I of the form may carry a company heading as is usual; the first writing line of zone I being line 7. Zone I ends with line 12; zone II begins and ends with 14 and 22, respectively; and zone III begins with line 24 to the end of the first sheet in the form. The lines immediately preceding the beginning of the zone lines may, as well be understood, carry pre-printed thereon the type of information which is to be typed in the zone.

FIGURE 6 shows a vertical program disc which has been perforated in the carriage return, zone, home, and overflow tracks so as to control the progress of the form illustrated in FIGURE 13. The form may be cut or continuous, a pin feed platen being provided for the latter as will be understood by those skilled in the art. As is evident, the index positions on the disc are numbered to correspond with the numbered lines on the form. Inasmuch as line 7 on the form is the first line on which information is to be entered, it is the home position on the form. This means that an operator will be required to roll line 7 into type receiving position.

As seen from FIGURE 13 a carriage return perforation is required in positions 8, 9, 10, 11 and 12 on the program disc 167 to effect stoppage of line feed, as will hereinafter appear, on each line in zone I. Carriage return track position 13 is not perforated as no information is to be entered in this line.

Position 14 will be perforated in the zone track and carriage return tracks in order that line feed will terminate at zone II, if initiated by a zone key depression within zone I, by a zone key depression at the end of typing on line 12, or by a carriage return key depression at the end of typing on line 12 in zone I. Positions 15 to 22 of zone II will carry carriage return perforations to effect stoppage at every line in the zone. Also at position 22 a perforation in the overflow I track is provided in the event that there are insufficient lines in zone II of the form. As will hereinafter appear the effect of a carriage return operation at the end of typing of line 22 will be to line feed the form to the beginning of zone II in a succeeding sheet of a continuous form; line feed being stopped thereat by a perforation in the overflow II track of the disc at position 14. Position 23 is not perforated and position 24 carries a zone and carriage return perforation to effect stoppage of line feeding at line 24 if the zone key is depressed within zone II or at the end of typing on line 22 thereof, or if a carriage return is initiated at the end of typing on line 22 in zone II. Position 25 carries a perforation in the carriage return track to stop the form at line 25 after carriage returning at the end of typing on line 24. The format of zone III as shown requires double spacing between every two typed lines so that positions 26, 29, 32 and 35 carry no perforations, and lines 27, 28, 30, 31, 33 and 34 carry perforations in the carriage return track.

Position 42 on the program disc is perforated in the home track whereby a carriage return or home key depression at the end of typing on line 34 will effect the ejection of a cut form or the movement of a continuous form to line 7 or home position on a succeeding sheet of the continuous form; the sensing of the home perforation will also return the vertical program disc to the home position shown and render horizontal program track I effective.

As heretofore disclosed each time a zone perforation in the program disc is sensed the step solenoid 255 in the switching device 240 will cause the selection of a different horizontal program track. As seen from the form in FIGURE 13, the horizontal format of zone I requires the entry of information at predetermined distances from the left hand side of the form as for example letter space positions 8 and 22; the horizontal format of zone II requires the entry of information beginning in letter space positions 5, 16 and 25; and the horizontal format of zone III requires the entry of information beginning in letter space positions 9 and 18. The horizontal program template over tracks I, II, and III respectively, will therefore be perforated in letter space positions 8 and 22, 5, 16, and 25, and 9 and 18; FIGURE 9 showing only 9 letter space positions.

*Operation*

To place the system in operation, an operator will move program switch 314 (FIGURE 12) to the on position as shown. Inasmuch as the home and step solenoids will have been energized as a result of a negative pulse, formed by an RC circuit generally designated 356, applied to the base of PNP transistor 347 when switch 314 was previously turned to off position, or power was turned on while switch 314 was in the off position, horizontal track I will be effective and the vertical program device will be positioned to home position whereby a program disc may be inserted. After inserting vertical and horizontal programs the operator then is required to roll the form shown in FIGURE 13 so that line 7 is positioned to receive data.

Since horizontal track I is enabled, the operator will then depress the tab key to bring letter space 8 before the printing station as heretofore described, and after inserting data, tab again to letter space 22 and enter data. After entering data on line 7 the operator will then depress the carriage return key or the line feed key, switch 324 being closed, whereby either will set the carriage return core 302 thereby effecting the energization of the line feed key puller solenoid 30 and also the energization of the carriage return key puller solenoid 29. As heretofore stated energization of the line feed key puller solenoid 30 will effect a line feed and effect the movement of program disc 167. At the end of line feed movement the interrogate switch 80 will close, and since a hole in position 8 opposite the carriage return track presents itself a current pulse will pass through the carriage return core reset winding 340 thereby resetting flip-flop 309 and de-energizing solenoid 30. Tabbing and carriage returning in the subsequent lines of zone I will be as described above.

After entering zone I information the operator will then depress the zone key which will again energize the line feed key puller solenoid 30 thereby initiating line feed operation which will continue until a zone hole is sensed; sensing a zone hole also effects the energization of the step solenoid 255 thereby enabling track II of the horizontal program device.

After typing in zone II, movement to zone III is effected by another zone key depression at which time horizontal program track III is rendered effective. After completing the form, depressing the home key effects, a carriage return and sets the home core thereby energizing the line feed key puller solenoid 30. When a home program hole is sensed hte line feed key puller solenoid 30 will drop out as heretofore described when contacts **137*a* and 137*b* open and latch open breaking the negative circuit to the line feed key puller; the latter occurring upon energization of release solenoid 128, which also permits program disc 167 to return to home at which time stud 135 effects reclosure of switch contacts 137*a* and 137*b* and re-engagement of ratchet 94 by armature detent 126. Centrifugal brake 154 controls the rate of return to home position. Also when a home hole is sensed the home solenoid 285 of the switching device 240 is pulsed and through contact 300, operated by slide 281, causes the step solenoid 255 of the swtiching device 240 to be energized whereby the switching device 240 may home at which time contacts 300 open and the step solenoid 255 causes ratchet member 253** to be re-engaged.

*Overflow*

Upon movement of the form to the last line in a zone, line 22 in zone II for example, the overflow I hole over track 173 will be beneath its associated brush 181 with the result that if a line feed or a carriage return is inadvertently called, the carriage return core 302 will be simultaneously set and reset; the set path being as before, and the reset path being through the overflow I program track 176 and associated brush 181 through the overflow set winding 353. The setting and resetting of the carriage return core will effect a cancellation therein but since the overflow core 305 remains set, the resulting output pulse will effect energization of solenoid 30 thereby initiating line feed operation. Line feed and vertical program indexing will continue until the home hole in position 42 is encountered by the home brush 181 thereby rendering transistor 347 conductive. When transistor 347 conducts the release solenoid and the home solenoid, 128 and 285 respectively, are energized. Energization of the release solenoid 128 moves its armature detent 126 out of the program device indexing ratchet 94 thereby permitting the vertical program to home position under the influence of spring 124. Simultaneously the movement of its armature also permits arm 132 to move into latched position thereby opening contacts 137*a* and 137*b* which removes power from the collector of transistor 312 and de-energizes solenoid 30. The vertical program device thereby returns to the home position shown in FIGURE 4 at which time stud 135 hits extension 134 of arm 132 unlatching the solenoid armature back into detenting position and thereby also causing arm 132 to move switch contacts 137*a* and 137*b* together.

Concurrently with the above sequence, the energization of the home solenoid 285 releases its slide 281 and switch 300 closes thereby energizing step solenoid 255 which releases ratchet wheel 258 whereby it can be rotated by gear 271 through friction discs 272. After a predetermined rotation sufficient to bring the cam 262 on flange 263 opposite slide 281 the latter will be moved downward and relatched by home solenoid armature 284 thereby opening contact 300 whereby the step solenoid 255 will drop out. Since the overflow core was not reset flip-flop 309 will still be in its other than normal state so that when release contacts 137*a* and 137*b* close the line feed key puller solenoid 30 will be re-energized and remain so, thereby effecting line feeding and vertical program indexing operation until the OFII hole in position 14 is opposite its associated brush at which time the interrogate pulse will reset the overflow core 305 through reset winding 340. This stop line feed and program indexing on line 14 of a succeeding sheet in the form whereat typing may be resumed.

*Safety provisions*

Should an operator inadvertently depress a combination of two program control keys simultaneously, thereby setting more than one core, as for example if the carriage return and zone cores were set, operation would be as follows. If a zone operation was desired, the mechanism would zone to the proper position since the program would not be perforated in the carriage return track between the last stopped position and the zone stop position. If, however, after typing the first line in the new zone, the operator depresses the C.R. key, nothing will happen since the C.R. core was not reset. This will halt automatic operation altogether.

If a carriage return operation was desired, the mechanism will line feed and stop at the next carriage return hole sensed but the zone core will remain in set condition. If then the operator tries to zone, nothing will happen because the core is already in set state. To arrive at the next zone will therefore require that the carriage return core be reset to initiate line feed which will continue until a zone hole is sensed which resets the zone core; assuming that no carriage return holes were sensed in the interim, thereby stopping operation. The carriage return core however will still be set so that subsequent depression of the carriage return key will not initiate line feeding. Hence operation will stop as before.

To prevent the above from happening a safety reset winding 360 is provided on the carriage return, zone and home cores. The safety reset windings 360 are serially connected and simultaneously pulsed each time the key puller solenoid 30 is de-energized thereby resetting the carriage return, zone, and home cores. This is accomplished by connecting one end of the serially connected safety reset windings to the back contact 361*a* of a form C contact generally designated by reference 361 associated with the line feed key puller solenoid 30, and the other end to positive supply terminal 315 through an RC pulse forming circuit generally designated 362.

In order to prevent an operator from inadventently setting the carriage return, zone, or home cores by key depression while in overflow, or while the program device is homing, the forward contact 361*b* operable by the key puller solenoid 30 is connected to and adapted to effect the energization of the auxiliary keyboard lock solenoid 42 (FIGURE 1) during line feed operation. Similarly the back contact 137*c* associated with the release magnet is adapted to energize the auxiliary keyboard lock solenoid 42 while the program device is homing.

Movement of switch 314 which comprises two ganged form C contacts, 314 and 314′, connects source 313 to the base of transistor 347 thereby energizing and maintaining energized the home solenoid 285 and release solenoid 128 as heretofore described whereby the vertical program plate 160 will return to home position under the influence of return spring 124 whereat despite that release solenoid 128 is energized contacts 137*a* and 137*b* will be held closed by stud 135. Movement of switch 314′ to the off position also connects, via conductor 365, the low side of the tab interposer solenoid to source 313 directly rather than through thyratron 242 whereby when a tab operation is called the tab solenoid 216 will be energized when switch 218 closes. Switch 314′ also connects source 313 to contact 137*b*.

The typewriter may now be operated manually i.e. without format control if desired by returning all the tab stops to unset position and selectively setting stops desired. The perforated programs, both vertical and horizontal, may be left in or removed. In manual operation the depression of any of the four keys will effect the energization of the line feed and carriage return solenoids as before. However as the program plate indexes, contacts 137*a* and 137*b* will open and be latched open since release solenoid is energized. Hence the line feed solenoid will drop out and line feed operation will stop after the first line feed. Since the release solenoid remains energized, the program spiral spring will return the program plate to home position after each line feed and program indexing operation; stud 135 reclosing contacts 137*a* and 137*b* when the home position is reached. Closure of contacts 137*a* and 137*b* connects source 313, via contacts 137*a* and 361*a* to the safety reset windings on the cores thereby resetting the core which was energized to initiate the line feed operation. In other words the program plate will oscillate between home position and the first index position whether the vertical program is removed or inadvertently left in the machine.

As is apparent the tab interposer solenoid in manual operation is energized immediately upon closure of switch 218 rather than from the horizontal program; thyratron 242 being inoperative with switch 314′ in the off position as shown in FIGURE 9. Carriage movement as will be understood will be stopped by a preset tab stop.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a typewriter having a movable carriage for supporting a worksheet and a platen rotatably mounted on said carriage for advancing said worksheet in vertical direction, line feed mechanism for indexing said platen, means for operating said line feed mechanism, a device having a continuous conductive track, program means for rendering said track effective at predetermined positions in accordance with a desired vertical format, means coupling said line feed mechanism with said device whereby the latter partakes of an indexing movement each line feed operation, controlled means for actuating and for maintaining actuated said line feed mechanism operating means, and means responsive to each line feed indexing operation for sensing said track on said device, said controlled means being operative in response to the sensing of positions on said track rendered effective to discontinue operation of said line feed mechanism operating means.

2. In a business machine having a movable carriage for supporting a worksheet and a platen rotatably mounted on said carriage for advancing said worksheet in a vertical direction, line feed mechanism for indexing said platen, line feed mechanism operating means, a device provided with a conductive track, means coupling said line feed mechanism with said device whereby said device is indexable with said line feed mechanism, controlled means for initiating operation of said line feed mechanism operating means, track sensing means, a selectively perforated disc mounted for movement with said device for exposing selected positions on said program track to said sensing means, and means operative in response to each operation of said line feed mechanism for connecting power to said track, said controlled means being responsive to the sensing of said track at said selected positions for discontinuing operation of said line feed mechanism operating means.

3. A typewriter having a platen and line feed mechanism for indexing said platen whereby a form may be advanced line by line, said form having successive vertical zones allotted to different classes of information, means for driving said line feed mechanism to effect line by line movement of said form, electromagnet means for coupling said drive means to said line feed mechanism, a bistable circuit adapted when activated to its other than normal state to energize said electromagnet means, a plurality of control elements each settable in response to the operation of associated operator controlled means thereby to activate said bistable circuit, and program means responsive to indexing movement of said platen to differing extents for resetting said control elements thereby to deactivate said bistable circuit.

4. Control apparatus for typewriter platen indexing mechanism adapted to advance forms to predetermined positions comprising electromagnet means adapted when energized to effect operation of said mechanism, a plurality of bistable control elements each operable upon assuming an other than normal state to effect the energization of said electromagnet means, a plurality of key controlled circuits each adapted to activate an associated one of said control elements to its other than normal state, means rotatably synchronized with said line feed mechanism having a plurality of conductive control tracks, a disc adapted to be removably mounted with respect to said last named means selectively perforated at predetermined index positions opposite said tracks in accordance with a desired format, means movable relative to said control tracks for sensing said tracks exposed through perforations in said disc, and means responsive to each operation of said platen indexing mechanism for energizing said tracks, said bistable elements being responsive to signals sensed from an associated energized track thereby effecting de-energization of said electromagnet.

5. In a typewriter having a movable carriage for supporting a worksheet for horizontal movement past a printing station and a platen rotatably mounted thereon for advancing said worksheet in a vertical direction, line feed mechanism, tabulating mechanism, a line feed mechanism program unit for controlling the operation of said line feed mechanism, a tabulating mechanism program unit having a plurality of programs for controlling the operation of said tabulating mechanism, means coupling said line feed program unit to said line feed mechanism whereby operation of said line feed mechanism indexes said line feed program unit, and means responsive to the indexing of said line feed programming unit to predetermined positions for selecting different programs in said tabulating mechanism program unit.

6. In a typewriter having a movable carriage for supporting a worksheet for horizontal movement past a printing station and a platen rotatably mounted thereon for advancing said worksheet in vertical increments, said worksheet having vertical zones reserved for the entry of different classes of information and horizontal zones reserved for data pertaining to said classes of information, line feed mechanism for effecting the vertical progress of said worksheet to progressive vertical zones, tabulating mechanism for effecting tabulating advance to progressive horizontal zones within a vertical zone, said horizontal zones varying from vertical zone to vertical zone, means for initiating operation of said line feed mechanism, means for terminating operation of said line feed mechanism at successve vertical zones, means for initiating operation of said tabulating mechanism, means for terminating tabulating operation at successive horizontal zones within a vertical zone, and means operable upon advance of said worksheet to each successive vertical zone for selecting a predetermined horizontal zone array.

7. In combination with a typewriter having a carriage mounted for movement in tabulating and return directions and a platen rotatably mounted on said carriage whereby a form carried by said carriage may be moved in horizontal and vertical directions; and keyboard controlled means for initiating line feed and tabulating movement of said platen and said carriage, of a vertical program device having pre-selected control terminals corresponding to lines on said form wherein printing is to be entered, means adapted to sense said pre-selected control terminals, means for moving said program device relative to said sensing means in response to successively initiated line feeds, means responsive to sensed pre-selected control terminal for terminating line feed movement, a horizontal program device having a plurality of array of pre-selected control terminals corresponding to letter space positions on said form, means adapted to sense said pre-selected control terminals as said carriage moves in tabulating direction, means responsive to signals sensed at selected control terminals for terminating tabulating movement, and means responsive to the sensing of said pre-selected control terminals on said vertical program device for rendering a different array of pre-selected control terminals on said horizontal program device effective.

8. In combination with a typewriter having a movable carriage for supporting a worksheet including a platen rotatably mounted thereon for advancing said worksheet in a line feed direction, the format of said worksheet requiring printing only on predetermined lines, an electromagnet, line feed mechanism under control of said electromagnet, a plurality of bistable control elements individually operable to a set and reset condition, means associated with each control element for generating signals for operating it to a set condition, means for energizing said electromagnet in response to the operation of any one of said bistable control elements to a set condition thereby to initiate operation of said line feed mechanism, a program device having a plurality of conductive control tracks, one associated with each of said bistable control elements, means connecting said line feed mechanism to said device whereby indexing movement of said mechanism is imparted to said device, means for connecting a voltage source to said conductive tracks each time said line feed mechanism indexes, circuit means for developing reset signals adapted to connect said control tracks with an associated bistable element whereby said elements will be reset upon connection of said source to said tracks thereby to terminate operation of said line feed mechanism, and means programmed in accordance with the format of a particular worksheet for preventing the connection of said tracks to said bistable elements except at pre-selected index positions thereof corresponding to the lines on the form which are to receive printing.

9. Apparatus as recited in claim 8 further comprising means responsive to any generated signal for effecting a carriage return operation.

10. Apparatus as recited in claim 8 wherein said bistable elements comprise a line feed core, a zone core and a home core, said cores having rectangular B-H characteristics, and each having a set, reset and output winding wound thereon, said generated signals being applied to associated set windings, said circuit means for developing reset signals connecting said voltage source through an associated track to said reset windings, whereby said output windings develop signals representative of the set and reset conditions of the core.

11. Apparatus as recited in claim 10 wherein said means for generating signals comprises circuitry including a line feed key operated switch associated with said line feed core, a zone key operated switch associated with said zone core, and a home key operated switch associated with said home core.

12. Apparatus as recited in claim 10 further comprising means responsive to a home core reset signal for effecting the return of said program device to a home position corresponding to the first printing line in a worksheet.

13. Apparatus as recited in claim 10 further comprising means associated with said line feed mechanism control electromagnet for resetting all of said cores whenever said electromagnet is de-energized.

14. Apparatus as recited in claim 10 further comprising means responsive to a home core reset signal for effecting the return of said program device to a home position corresponding to the first printing line in a worksheet, and means associated with said line feed mechanism control electromagnet for locking the typewriter keyboard while said program device is homing.

References Cited in the file of this patent

UNITED STATES PATENTS

| | | |
|---|---|---|
| 2,138,646 | Scharr | Nov. 29, 1938 |
| 2,255,011 | Lake et al. | Sept. 2, 1941 |
| 2,531,885 | Mills et al. | Nov. 28, 1950 |